United States Patent
Fujinoki et al.

(10) Patent No.: US 6,689,705 B2
(45) Date of Patent: Feb. 10, 2004

(54) SYNTHETIC QUARTZ GLASS OPTICAL MATERIAL AND OPTICAL MEMBER

(75) Inventors: Akira Fujinoki, Koriyama (JP); Hiroyuki Nishimura, Koriyama (JP); Toru Yokota, Koriyama (JP); Yasuyuki Yaginuma, Koriyama (JP); Akira Sato, Koriyama (JP); Tetsuji Ueda, Koriyama (JP)

(73) Assignees: Heraeus Quarzglas GmbH & Co., KG, Hanau (DE); Shin-Etsu Quartz Products Co., Ltd., Tokyo (JP)

( * ) Notice: Subject to any disclaimer, the term of this patent is extended or adjusted under 35 U.S.C. 154(b) by 0 days.

(21) Appl. No.: 10/048,309

(22) PCT Filed: May 28, 2001

(86) PCT No.: PCT/EP01/06061
§ 371 (c)(1),
(2), (4) Date: Jan. 29, 2002

(87) PCT Pub. No.: WO01/92175
PCT Pub. Date: Dec. 6, 2001

(65) Prior Publication Data
US 2002/0151425 A1 Oct. 17, 2002

(30) Foreign Application Priority Data
May 29, 2000 (JP) ................................ 2000-158943

(51) Int. Cl.⁷ ............................................ C03C 3/06
(52) U.S. Cl. ................................................... 501/54
(58) Field of Search ................................ 501/54, 900

(56) References Cited

U.S. PATENT DOCUMENTS

5,028,967 A  7/1991  Yamada et al.
6,319,634 B1 * 11/2001  Berkey et al. ............... 430/5

FOREIGN PATENT DOCUMENTS

| EP | 1084995 A1 * | 3/2001 | ........... C03B/19/14 |
| GB | 1 492 920 | 11/1977 | |
| JP | 2000-239040 | 9/2000 | |
| WO | WO 00/55100 | 9/2000 | |

OTHER PUBLICATIONS

Patent Abstracts of Japan for JP 2000239040.

* cited by examiner

Primary Examiner—David R Sample
Assistant Examiner—Elizabeth A. Bolden
(74) Attorney, Agent, or Firm—Tiajoloff & Kelly; Andrew L. Tiajoloff

(57) ABSTRACT

An object of the present invention is to provide a synthetic quartz glass optical material having a high optical transmittance for a radiation 157 nm in wavelength emitted from $F_2$ excimer laser and a high resistance against irradiation of a $F_2$ excimer laser radiation, yet having a uniformity suitable for such a fine patterning using a $F_2$ excimer laser, and to provide an optical member using the same. The problems above are solved by a synthetic quartz glass optical material for $F_2$ excimer lasers having an OH group concentration of 0.5 ppm or lower, a fluorine concentration of 0.1 to 2 mol %, a hydrogen molecule concentration of $5 \times 10^{16}$ molecules/$cm^3$ or lower, a difference between the maximum and minimum fluorine concentrations within 20 mol ppm, and a difference between the maximum and minimum refraction indices of $2 \times 10^{-5}$ or lower.

18 Claims, 7 Drawing Sheets

ORDINATE HAS ANY UNIT

Fig. 6

| | | Example1 | Comparative Example1 | Example2 | Comparative Example2 | Comparative Example3 | Comparative Example4 | Example3 | Example4 | Comparative Example5 |
|---|---|---|---|---|---|---|---|---|---|---|
| Concentration of OH Groups | ppm | <0.1 | <0.1 | <0.1 | <0.1 | <0.1 | <0.1 | <0.1 | <0.1 | <0.1 |
| Concentration of fluorine | concentration mol% | 1.0 | 1.0 | 1.0 | 1.0 | 1.0 | 1.2 | 1.0 | 0.9 | 0.9 |
| | $\Delta$F molppm | 15 | 55 | 80 | 80 | 80 | 120 | 80 | 60 | 60 |
| | Distribution | *1 | *1 | *1 | *1 | *1 | *1 | *1 | *2 | *2 |
| Density of Hydrogen molecules | Molecules/cm$^3$ | <5x10$^{16}$ | <5x10$^{16}$ | <5x10$^{16}$ | <5x10$^{16}$ | <5x10$^{16}$ | <5x10$^{16}$ | <5x10$^{16}$ | <5x10$^{16}$ | <5x10$^{16}$ |
| Fluctuation in Refractive index | $\Delta$n | 1.5x10$^{-5}$ | 3.5x10$^{-5}$ | 1.5x10$^{-5}$ | 6.5x10$^{-5}$ | 3.0x10$^{-5}$ | 5.0x10$^{-5}$ | 1.8x10$^{-5}$ | 1.5x10$^{-5}$ | 12.2x10$^{-5}$ |
| Fictive Temperature | $\Delta$FT □ | 20 | 20 | 45 | 10 | 70 | 40 | 30 | 30 | 45 |
| | Highest Temp. □ | 910 | 910 | 890 | 920 | 860 | 880 | 940 | 910 | 890 |
| | Distribution | *2 | *2 | *2 | *1 | *2 | *2 | *2 | *1 | *2 |
| Internal Transmittance | 157nm% | 91 | 91 | 93 | 94 | 94 | 95 | 94 | 93 | 93 |
| | 163nm% | 94 | 94 | 96 | 96 | 96 | 96 | 96 | 96 | 96 |
| Birefringence | nm/cm | 0.5 | 0.5 | 0.3 | 0.7 | 0.1 | 0.2 | 0.6 | 0.5 | 0.3 |

*1 Approximately spherical plane downwardly projecting

*2 Approximately spherical plane upwardly projecting

Fig. 7

| Fluorine concentration mol% | OH group Concentration ppm | Transmittance for a radiation 163 nm in wavelength before irradiation | Transmittance for a radiation 157 nm in wavelength before irradiation | Transmittance for a radiation 157 nm in wavelength after irradiation | Evalution |
|---|---|---|---|---|---|
| 0.05* | 8.0* | 96 | 76 | 65 | x |
| 0.2 | 0.3 | 94 | 87 | 84 | o |
| 0.7 | 0.5 | 93 | 89 | 89 | o |
| 1.0 | 6.0* | 95 | 77 | 68 | x |
| 1.0 | 0.3 | 96 | 93 | 93 | o |
| 1.5(B) | 1.2* | 93 | 89 | 78 | x |
| 1.5(A) | 0.3 | 91 | 91 | 91 | o |
| 1.5 | 0.3 | 86* | 90 | 72 | x |
| 1.8 | 0.1 | 93 | 92 | 89 | o |
| 2.2* | 0.1 | 85* | 90 | 73 | x |

- In the evaluation column, "o" falls within the scope of the present invention, and "x" falls outside of the scope of the present invention.
- The value which falls outside of the range of the present invention is marked with *
  In the above table, "(A)" means A of Fig. 6, and "(B)" means B(Comparative Example).

SYNTHETIC QUARTZ GLASS OPTICAL MATERIAL AND OPTICAL MEMBER

TECHNICAL FIELD OF THE INVENTION

The present invention relates to a synthetic quartz glass optical member that transmits a $F_2$ excimer laser radiation such as a lens, a prism, a filter, a photomask, etc., and to an optical material for the same.

PRIOR ART

The technique of photolithography, which transfers a circuit pattern on a mask to a wafer by using light, is economically superior to other techniques using electron beam or an X-ray radiation, and is thereby widely used as an exposure technique for producing integrated circuits.

With the recent demand for further miniaturized and highly integrated LSIs, radiations with shorter wavelengths are being used as the light source, and aligners using i-lines 365 nm in wavelength capable of forming patterns with line widths in a range of from 0.5 to 0.4 $\mu$m or those using KrF excimer laser radiations capable of forming patterns with line widths in a range of from 0.18 to 0.35 $\mu$m have been put to practical use. Moreover, an aligner using an ArF excimer laser emitting radiations 193 nm in wavelength and capable of forming patterns with line widths in a range of from 0.10 to 0.20 $\mu$m is now placed under development.

As an apparatus for the next age lithography, there are studied an electron beam direct patterning technology, a X-ray proximity ion lithography, and a $F_2$ excimer laser exposure technology. Among them, electron beam direct writing technology has a problem concerning its throughput, and the X-ray proximity ion lithography suffers a problem in forming the mask. Thus, the $F_2$ excimer laser exposure technology is attracting most attention as the next age exposure technology.

From the view point of transmittance, resistance against laser radiations, uniformity, etc., a quartz glass, and particularly, a high purity synthetic quartz glass has been used as the optical material for use in the conventional excimer lasers using KrF, ArF, etc. A quartz glass exhibits high optical transmittance in the wavelength region for the KrF and ArF laser radiations, and the resistance against laser radiation can be increased by optimizing the conditions of production. Hence, an optical material, and particularly such usable as a projection lens, is already available.

However, since a $F_2$ excimer laser generates a radiation at a wavelength of 157 nm, i.e., a wavelength further shorter than that of an ArF excimer laser, it was found impossible to obtain a sufficiently high transmittance with the synthetic quartz glass used conventionally for a KrF or an ArF excimer laser. Hence, the optical material usable for the $F_2$ excimer laser was limited only to fluorite. This was a great limitation in designing the apparatus.

On the other hand, in JP-A-Hei4-195101 (the term "JP-A-" as referred herein signifies "an unexamined published Japanese patent application") is disclosed a technology for reducing or extinguishing the defects that absorb the radiation in the wavelength region of from 155 to 400 nm, and for preventing the generation of defects even in case a high energy ultraviolet radiation is irradiated for a long duration of time. However, the effect of the technology concerning the resistance against a laser radiation is confirmed only for an ArF excimer laser radiation, and there is no description concerning the resistance against a radiation of a $F_2$ excimer laser.

Furthermore, JP-A-Hei8-67530 discloses a technology for increasing the stability against an ArF excimer laser radiation by doping a quartz glass with 1% by weight or more of fluorine and 10 ppm or more of OH groups. This publication also shows a considerable improvement in the transmittance for ultraviolet radiation in the vicinity of 157 nm, i.e., in the wavelength region of a $F_2$ excimer laser radiation.

Problems the Invention is to Solve

Surely, the optical stability of a quartz glass against an ArF excimer radiation can be improved by incorporating fluorine into the quartz glass. However, in case of a $F_2$ excimer laser radiation with a further shorter wavelength as compared with the ArF excimer laser radiation, it has been found that the technology above is not capable of sufficiently suppressing the generation of defects attributed to the irradiation of an excimer laser radiation.

The present inventors studied the physical properties and the damage behavior of a quartz glass under the irradiation of a $F_2$ excimer laser radiation in case the ultraviolet radiation is changed to that of a $F_2$ excimer laser. As a result, the glass characteristics suitable for a quartz glass material for optical use together with a $F_2$ excimer laser has been discovered. The present invention has been accomplished based on these findings.

More specifically, an object of the present invention is to provide a synthetic quartz glass optical material having a high optical transmittance for a radiation 157 nm in wavelength emitted from $F_2$ excimer laser and a high resistance against irradiation of a $F_2$ excimer laser radiation, yet having a uniformity suitable for such a fine patterning using a $F_2$ excimer laser, and to provide an optical member using the same.

Means for Solving the Problems

The problems above are solved by any of the constitutions (1) to (8) described below.

(1) A synthetic quartz glass optical material for $F_2$ excimer lasers having an OH group concentration of 0.5 ppm or lower, a fluorine concentration of 0.1 to 2 mol %, a hydrogen molecule density of $5 \times 10^{16}$ molecules/cm$^3$ or lower, a difference between the maximum and minimum fluorine concentrations within 20 mol ppm, and a difference between the maximum and minimum refraction indices of $2 \times 10^{-5}$ or lower.

(2) A synthetic quartz glass optical material for $F_2$ excimer lasers having an OH group concentration of 0.5 ppm or lower, a fluorine concentration of 0.1 to 2 mol %, a hydrogen molecule density of $5 \times 10^{16}$ molecules/cm$^3$ or lower, a difference between the maximum and minimum fluorine concentrations within 100 mol ppm, a difference between the maximum and minimum fictive temperatures within 50° C., and a difference between the maximum and minimum refraction indices being set to $2 \times 10^{-5}$ or lower by relatively forming a fluctuation in refractive indices in accordance with the fictive temperature, in such a manner that the fluctuation in refractive indices attributed to the distribution in the concentration of fluorine be cancelled.

(3) A synthetic quartz glass optical material for $F_2$ excimer lasers as described in constitution (2) above, wherein the maximum value in the distribution of fictive temperature is 920° C. or lower.

(4) A synthetic quartz glass optical material for $F_2$ excimer lasers as described in one of constitutions (1) to (3) above, wherein the internal transmittance for a radiation 157 nm in wavelength emitted from $F_2$ excimer lasers is 70% or higher.

(5) A synthetic quartz glass optical material for $F_2$ excimer lasers as described in one of constitutions (1) to (3) above, wherein the internal transmittance for a radiation 163 nm in wavelength is 90% or higher.

(6) A synthetic quartz glass optical material for $F_2$ excimer lasers as described in one of constitutions (1) to (3) above, wherein the drop in transmittance for a radiation 157 nm in wavelength after irradiating thereto $3 \times 10^6$ pulses of $F_2$ excimer laser radiation at an energy density per pulse of 10 mJ/cm$^2$ is 5% per 10 mm or less.

(7) A synthetic quartz glass optical material for $F_2$ excimer lasers as described in one of constitutions (1) to (3) above, wherein the birefringence measured at a wavelength of 633 nm is 0.5 nm/cm or lower.

(8) A synthetic quartz glass optical member for $F_2$ excimer lasers formed by using a synthetic quartz glass optical material as described in one of constitutions (1) to (7) above.

Embodiments for Practicing the Invention

It is required that the synthetic quartz glass according to the present invention is a synthetic quartz glass obtained by a so-called soot process. A synthetic quartz glass obtained by the soot process can achieve a combination of requirements necessary for solving the problems, i.e., a synthetic quartz glass having a low OH group concentration and a high fluorine concentration.

The synthetic quartz glass is obtained from a soot process briefly described below, comprising a step of forming a porous silica mother body (which is referred to hereinafter as "a soot body"), in which a volatile silicon raw material, for instance, a silicon halide material represented by $SiCl_4$, an alkoxysilane such as $SiCH_3(OCH_3)$, $Si(OCH_3)$, etc., or a siloxane such as $Si(CH_3)_3OSi(CH_3)_3$, $(Si(CH_3)_3O)_4$, etc., is hydrolyzed in a combustion flame containing oxygen and hydrogen, and the fine silica particles generated thereby are deposited on a rotating base body; a step of doping the resulting soot body with fluorine by thermally treating the soot body under an atmosphere containing fluorine; and a step of vitrifying the resulting soot body to obtain a transparent glass body.

The synthetic quartz glass optical material and an optical member for use with a $F_2$ excimer laser according to the present invention are characterized by that they have an OH group concentration of 0.5 ppm or lower, a fluorine concentration of 0.1 to 2 mol %, a hydrogen molecule density of $5 \times 10^{16}$ molecules/cm$^3$ or lower, and a difference between the maximum and minimum fluorine concentrations within 20 mol ppm. In this manner, the synthetic quartz glass optical material and an optical member according to the present invention achieves an improved uniformity capable of yielding a difference between the maximum and minimum refraction indices of $2 \times 10^{-5}$ or lower, while improving the resistance against laser irradiation as such capable of minimizing the drop in transmittance from the high initial value even after an irradiating a $F_2$ excimer laser radiation for a prolonged duration of time.

In the synthetic quartz glass optical material according to the present invention, the OH group concentration is confined to be 0.5 ppm or lower based on the reasons as follows.

Conventionally, OH groups were believed to increase stability against the irradiation of $F_2$ excimer laser radiations. However, since OH groups absorb radiations with energy of 7.8 eV (159 nm), they not only reduces the transmittance of $F_2$ excimer laser radiation with a wavelength of 159 nm, but also severely influence the stability against the irradiation of a $F_2$ excimer laser radiation.

That is, it has been found that the irradiation of a $F_2$ excimer radiation generates NBOHCs (Non-Bridged Oxygen Hole Centers), and that it thereby is the cause of generating defects.

In the light of such circumstances, the upper limit of the OH group concentration was set, as described above, to 0.5 ppm or lower, preferably, to 0.1 ppm or lower. In fact, on irradiating a $F_2$ excimer laser radiation to a quartz glass containing OH groups at a concentration of about 10 ppm, it has been confirmed that E' (E prime) centers having an absorption peak at 215 nm generate together with an intense NBOHC having an absorption peak at a wavelength of 260 nm. At the same time, the infrared absorption peak at a wavenumber of 3680 cm$^{-1}$ assigned to OH groups was found to be shifted to the lower wavenumber side by about 26 cm$^{-1}$, while lowering its peak intensity by about 6%.

The above phenomenon was not observed in the conventional cases of irradiating KrF or ArF excimer laser radiations, and it is believed attributed to the generation of NBOHCs, resulting from the irradiation of an intense ultraviolet radiation by a $F_2$ excimer laser, which affected the O—H bonds in Si—OH groups. Accordingly, the OH group concentration must be confined to 0.5 ppm or lower.

Next, the reason for setting the fluorine concentration in a range of from 0.1 to 2% by mole in the synthetic quartz glass optical material according to the present invention is described below.

In the synthetic quartz glass optical material according to the present invention, the fluorine concentration is confined in the range described above. In this manner, the induction of paramagnetic defects, i.e., the E' centers (E prime centers), is prevented from occurring on irradiating a $F_2$ excimer laser radiation. Thus, the drop in optical transmittance of a radiation 157 nm in wavelength attributed to the generation of E' centers is suppressed to thereby suppress the decrease in resistance against irradiation of $F_2$ excimer laser radiations.

If fluorine should be incorporated at a concentration lower than 0.1% by mole, the effects above cannot be sufficiently obtained; on the other hand, if fluorine should be doped into the quartz glass at an amount exceeding 2% by mole, the quartz glass tends to induce oxygen deficient defects. Thus, fluorine is preferably incorporated in the quartz glass in a range of from 0.1 to 2% by mole, and more preferably, in a range of from 0.7 to 1.5% by mole.

In the present invention, the fluorine concentration in the quartz glass is realized by doping F. As the F source, preferably used are, for instance, gaseous $SiF_4$ or $SF_6$. Gaseous $SiF_4$ or gaseous $SF_6$ provides a gaseous atmosphere having a dehydration ability while suppressing the formation of oxygen deficient defects, and achieves a quartz glass having a low OH group concentration and a low oxygen deficient defects. Among the gaseous atmosphere above, $SiF_4$ is preferred in view of its ability for suppressing the generation of oxygen deficiency. As other gases having a dehydrating ability, there can be mentioned gaseous chlorine, i.e., a gaseous halogen similar to those enumerated above; however, gaseous chlorine is not preferred because it is apt to generate oxygen deficiencies.

Next, the reason for setting the density of hydrogen molecules in a range of $5 \times 10^{16}$ molecules/cm$^3$ or lower is described below. When a $F_2$ excimer laser radiation is irradiated to a quartz glass containing hydrogen molecules at a density of about $1 \times 10^{17}$ molecules/cm$^3$, the transmittance for a radiation 157 nm in wavelength was found to decrease even though the concentrations for fluorine and OH groups were set to their desired ranges. In the resulting quartz glass, the generation of OH groups was observed after the irradiation of the laser radiation, and at the same time, NBOHCs, which are believed to be induced from the OH groups, were observed to form inside the quartz glass.

It has been found that defects similar to those that form inside the quartz glass containing OH groups on irradiating a laser radiation generate because the hydrogen molecules that are incorporated dissolved inside the quartz glass generate OH groups by forming bonds with the oxygen present inside the quartz glass. If the density of hydrogen molecules should exceed the range defined above, the resistance against laser radiation becomes degraded, and the transmittance for radiation 157 nm in wavelength thereby decreases on irradiating a $F_2$ excimer laser radiation.

What is important in the requirements on the synthetic quartz glass optical material required in the present invention is that the high transmittance is maintained to an extremely high wavelength region of 157 nm corresponding to that of the extreme ultraviolet wavelength region (for instance, preferred is that the internal transmittance of 70% or higher, particularly preferably 80% or higher, and further preferably, 90% or higher, is maintained for the wavelength of 157 nm of the $F_2$ excimer laser radiation). In order to achieve the requirements, the concentration of metallic impurities that shifts the absorption edge to the higher wavelength side must be lowered as much as possible, and must be controlled in the ppb level. Accordingly, a volatile silicon compound with extremely high purity must be selected as the raw material. Furthermore, particular consideration must be made to suppress the contamination due to impurities during the entire process.

To achieve such a high transmittance as described above, the total concentration of five transition metals, i.e., Cu, Ni, Ti, Cr, and Fe, should be controlled to 30 ppb or lower, that of three alkali metal elements, i.e., Na, Li, and K, should be controlled to 50 ppb or lower, and that of three alkaline earth metal elements, i.e., Ca, Ba, and Mg, should be controlled to 80 ppb or lower.

Furthermore, the transmittance in the wavelength region above is greatly influenced by the dissolved gas. If gaseous oxygen and gaseous ozone should be present inside the quartz glass optical material, they cause absorption of radiations in the ultraviolet region. This shifts the absorption edge to the longer wavelength side and, at the same time, this becomes a key cause of generating defects such as the NBOHCs. Thus, the concentration of dissolved gas is preferably as low as possible.

Accordingly, the transmittance for a radiation 157 nm in wavelength itself functions as an important measure representing the stability with respect to the laser radiation.

Furthermore, the quartz glass optical material according to the present invention preferably yields an internal transmittance of 90% or higher for a radiation 163 nm in wavelength.

In order to assure a practical stability in case of using quartz glass as an optical material, preferably, the quartz glass optical material for use in transmitting $F_2$ excimer laser radiation according to the present invention yields a drop in transmittance for a radiation 157 nm in wavelength confined to 5% or less per 10 mm after irradiating $F_2$ excimer laser radiation in pulses for $3\times10^5$ repetition times with an energy density of 10 mJ/cm$^2$.

The above condition corresponds to a drop in transmittance for a practical case in which the transmission energy is 0.1 mJ/cm2 for a range of $3\times10^7$ to $3\times10^9$ pulses, and assures a durability sufficiently high as an exchangeable optical component.

Furthermore, the synthetic quartz glass optical material according to the present invention preferably yields a birefringence of 0.5 nm/cm or lower in case of measurement using a radiation 633 nm in wavelength.

A precise measurement for the birefringence can be carried out by using an ellipsometer equipped with a He/Ne laser (emitting light at a wavelength of 633 nm), and by measuring the difference in optical path (i.e., retardation, $\Delta$nd) between two polarized lights that are generated by the birefringence, each having their direction of vibration crossing each other at the right angle. For instance, in a specimen 5 cm in thickness and having an observed retardation of 20 nm, the birefringence can be obtained as 4 nm/cm by dividing the retardation by the thickness.

The influence of birefringence of a practically employed optical member is determined by evaluating the retardation with respect the wavelength. For instance, in the example above with a retardation of 20 nm, the evaluation can be made by dividing 20 nm by 633 nm, i.e., 20/633, and this equals to 0.0316$\lambda$ (i.e., <$\lambda$/30). In this case, the material can be used without any problem, however, in case a light 153 nm in wavelength is used, the same retardation is evaluated as 20/157=0.127$\lambda$ (i.e., about$\lambda$/8). Accordingly, the birefringence in the latter case is more than four times as large as that of the former case. Thus, there remains possibility of causing problems. Furthermore, since the wavelength region corresponds to such in which the photoelastic constant exhibits wavelength dependence, the birefringence that is measured at the wavelength of 633 nm becomes larger for a radiation 157 nm in wavelength. In this context, it is important that the optical material for use with $F_2$ excimer lasers should yield a birefringence at a wavelength of 633 nm of 0.5 nm/cm or lower, i.e., one-fourth of the value conventionally allowed in the art.

As described in the foregoing, in the present invention, studies were made on various elements influencing the optical characteristics of quartz glass to determine the optimal range of their concentration. Ideally, the elements above are preferably distributed completely uniformly over the entire glass body. In practice, however, the ideal state cannot be achieved in view of the transportation of substances and heat during the synthetic process, the heat treatment process, and the diffusion process, and this results in a glass body having some distribution. The thus established distribution leads to a homogeneous glass body, and the influence thereof is quite large particularly in case the quartz glass is employed in a precision optical equipment equipped with a $F_2$ excimer laser.

Accordingly, in the present invention, particular notice was taken on the distribution of fluorine concentration, whose slight difference leads to a fluctuation in refractive index in which basically uniformity is required. Thus, in one aspect, the present invention is characterized by that the difference between the maximum and the minimum values in fluorine concentration is strictly defined to fall within 20 mol ppm. In addition to the characteristic described above, in the present invention, it was possible to improve the uniformity of the quartz glass as such that the difference between the maximum and the minimum refractive indices in the direction making right angles with respect to the optical axes (as viewed in the direction along the radius in case of a lens) should become as low as $2\times10^{-5}$ or lower.

On the other hand, from an industrial viewpoint, an extremely strict control in conditions is not always preferred because it leads to an increase in production cost. Accordingly, studies were made with an aim to seek for another means for achieving uniformity by canceling out with a different element even in case the difference between the maximum and the minimum values of fluorine concentration should exceed a value of 20 mol ppm.

As a result, the present invention is characterized by that the difference between the maximum and minimum fluorine concentrations is set within 100 mol ppm, a difference between the maximum and minimum fictive temperatures is set within 50° C., and that the difference between the maximum and minimum refraction indices being set to $2 \times 10^{-5}$ or lower by properly forming a fluctuation in refractive indices in accordance with the fictive temperature, in such a manner that the fluctuation in refractive indices attributed to the distribution in the concentration of fluorine be cancelled—or, by controlling the distribution in fluorine concentration in such a manner to control the influence of the fictive temperature distribution.

In the present invention, preferably, the fluorine concentration distribution is set in such a manner that it forms an approximately hemispherical plane with a rotation symmetry having a minimum value at the axis of rotation symmetry, and the fictive temperature distribution is set in such a manner that it forms an approximately hemispherical plane with a rotation symmetry having a maximum value at the axis of rotation symmetry.

The fluorine concentration distribution in the quartz glass is mainly determined by the density distribution of the soot body and the concentration of the fluorine-containing gas during the atmospheric treatment as well as that during the vitrification. Thus, by properly controlling them, for instance, the concentration at the central portion can be set higher, or reversely, lower, than that at the outer peripheral portion. It is industrially far easier to allow such a distribution in concentration than achieving a flat concentration distribution having completely no fluorine concentration distribution between the central portion and the outer peripheral portion. The refractive index of the quartz glass is influenced by the fluorine concentration, and it decreases by $1 \times 10^{-6}$ by increasing the fluorine concentration by 1 mol ppm.

On the other hand, fictive temperature is a concept introduced by Bruckner in the '70s. According to this concept, the structure (physical properties) of a glass becomes fixed in case a glass body is cooled from the temperature condition during synthesis and heat treatment, and hence, the temperature at which the physical properties are fixed is denoted as the "fictive temperature". More specifically, the fictive temperature influences the density and the refractive indices, and also in case of quartz glass, it is known that the density and the refractive indices change depending on the fictive temperature.

The distribution in fictive temperature inside the glass body generates in accordance with the difference in cooling rate that is generated within the glass body during cooling the quartz glass. Even if the original quartz glass body should have some distribution in fictive temperatures, a flat distribution can be achieved by once holding the glass body at a temperature not lower than the strain point, however, a new distribution can be set in the subsequent cooling process. Since the distribution in fictive temperature greatly depends on the size of the glass body, shape, and the cooling rate, it is thereby possible to realize a desired distribution by properly selecting the above factors. The refractive index of a synthetic quartz glass is expressed as a function of the fictive temperature, and roughly, the refractive index increases by $1.5 \times 10^{-6}$ by decreasing the fictive temperature by 1° C.

By combining the two factors influencing the refractive index of a quartz glass, i.e., the fictive temperature distribution and the fluorine concentration distribution, as described above, the distribution in refractive index within a quartz glass body can be flattened.

However, the key point in obtaining a flat distribution in refractive index by favorably combining the two factors above is that the fictive temperature distribution and the fluorine concentration distribution can be superposed in such a manner that the distribution form thereof can cancel out each other. More specifically, it is necessary that the distribution forms are each expressed by approximately a simple quadratic curve, that these quadratic curves have a common axis of symmetry, that the distribution forms are in a shape capable of canceling out their influences on the refractive index, and, further, that the distribution width fall within a predetermined range capable of canceling out the effect of each other.

In the fluorine concentration distribution and the fictive temperature distribution, the distribution should be in a convex or a concave form constituting a part of a hemispherical plane, provided that the apices are set in the axis rotation symmetry. Furthermore, in case the spherical plane is cut by a flat plane including the axis or rotation symmetry, the crossing lines that are found in the flat plane must be provide a quadratic curve, preferably, an arc. Although there are cases that the crossing line yield a curve of a higher order function such as those of fourth or sixth order depending on the conditions for doping F and the annealing condition, these distribution forms with higher order functions are not preferred even if they do not yield any inflection points. Still, however, the portion yielding a shape substantially regarded as an arc can be used by cutting off the undesired portions.

In the description above, "the portion yielding a shape substantially regarded as an arc" refers to a case that the difference between the distribution curve for the refractive index obtained from the curve above and that obtained by a hypothetical arc yields, as shown in FIG. 4, a difference falling within ⅕ of the entire distribution in refractive index.

A preferred fluorine concentration distribution and fictive temperature distribution is described below by making reference to the drawings.

FIG. 1 schematically shows the fluorine concentration distribution inside a quartz glass body according to the present invention; in the figure, the abscissa represents the position, and the ordinate represents the concentration. It should be noted that the abscissa and the ordinate are given in relative units. The ordinate corresponds to the central axis, and, although the central axis (ordinate) is shown as an axis of symmetry in the figure, the practical distribution is such with a rotation symmetry having a rotation axis at the central axis.

FIG. 2 shows the fictive temperature distribution, and, similar to the case in FIG. 1, the abscissa represents the position, and the ordinate represents the temperature. The ordinate is the same as that of FIG. 1.

FIG. 3 shows the distribution in refractive index obtained from the fluorine concentration distribution, the same obtained from the fictive temperature distribution, and the refractive index distribution of the quartz glass body obtained by canceling out the former two distributions. Thus, as described above, it can be understood that a flat distribution in refractive index can be obtained by canceling out the contribution of the two distribution forms to the distribution in refractive index.

Referring to the figures, the ordinate provides a relative concentration. However, as described above, the practical controllable range of distribution should be set in such a manner that the difference between the maximum and the minimum fluorine concentration, $\Delta F$, should be set to 100 mol ppm or lower, and that the difference between the maximum and the minimum fictive temperature, $\Delta FT$, should be set to fall within 50° C. If ΔF and ΔFT should fall outside the range defined above, difficulty would be encountered in mutually canceling out the distribution forms.

In practice, the fluorine concentration inside a quartz glass body exhibits an intrinsic distribution at the point of production. On the other hand, the fictive temperature distribution can be set to various shapes depending on the annealing conditions. Furthermore, the fictive temperature distribution can be homogenized by holding the quartz glass body at a temperature not lower than the strain point for a predetermined duration of time to reset the distribution form acquired before heating. Hence, it is possible to set a more preferred fictive temperature distribution based on the distribution in refractive index on observing the resulting distribution form by annealing again the quartz glass body under proper conditions.

However, it should be noted that, since the quartz glass body is apt to take up impurities during the annealing process from the surroundings, the atmosphere inside the furnace must be controlled to a state with low impurity concentration. Furthermore, more preferred is to take measures such as applying the annealing after covering the quartz glass body with a vessel made of synthetic quartz glass, etc.

EXAMPLES

Example 1

A high purity $SiCl_4$ was hydrolyzed in an oxyhydrogen flame, and the fine silica particles generated thereby were deposited on a rotating base body to obtain a white-colored opaque soot body. The soot body thus obtained weighed 2 kg, and yielded a bulk density of 0.25 g/cm³. The resulting soot body was subjected to a heat treatment inside an electric furnace at 1000° C. for a duration of 5 hours inside a mixed atmosphere of gaseous nitrogen and gaseous oxygen (mixing ratio by volume: $N_2/O_2$=80/20) to control the density distribution.

Subsequently, the soot body was further subjected to a heat treatment for 10 hours under the same temperature condition, but by changing the atmosphere to that of a mixed gaseous $SiF_4$ and He (mixing ratio by volume: $SiF_4/He$=3/97), and the resulting product was slowly passed through a furnace set to a maximum temperature of 1460° C. under an atmosphere of mixed gaseous $SiF_4$ and He (mixing ratio by volume: $SiF_4/He$=5/95) at a speed of 1 mm/min to obtain a transparent quartz glass ingot by vitrification.

The both ends of the thus obtained quartz glass ingot were supported by left and right chucks of a lathe, and after forming a melting zone by locally heating a part of the ingot with a burner flame, the left and right chucks were rotated at differed rotation times. By applying a shear force to the melting zone in this manner, the burner was slowly moved while stirring the melting zone to homogenize the entire ingot. To increase the homogeneity, this homogenization operation was conducted 5 times in total. The homogenized ingot was set inside a high purity graphite crucible, and was heated to 1800° C. to shape the quartz glass into a disk 150 mm in diameter and 50 mm in thickness by deformation utilizing its self-weight.

The thus obtained shaped body was placed inside a synthetic quartz glass vessel to prevent contamination due to impurities from occurring on the body, and the entire vessel was set inside an electric furnace. Then, after holding it at 1150° C. for 20 hours under the atmospheric condition, the body was gradually cooled to 800° C. at a cooling rate of 5° C./hr, at which temperature the current to the furnace was cut to allow the body to cool to room temperature as it is. Thus was obtained a shaped body for Example 1.

Comparative Example 1

A quartz glass ingot obtained under the conditions similar to those described in Example 1 was subjected only once to a homogenization treatment by zone melting process, and the entire vessel was set inside a high purity graphite crucible to apply heating and shaping. Then, by applying a similar operation as that described in Example 1, the resulting product was shaped into a disk 150 mm in diameter and 50 mm in thickness.

The resulting shaped body was placed inside a synthetic quartz glass vessel to prevent contamination due to impurities from occurring on the body, and the entire vessel was set inside an electric furnace. Then, after holding it at 1150° C. for 20 hours under the atmospheric condition, the body was gradually cooled to 800° C. at a cooling rate of 5° C./hr, at which temperature the current to the furnace was cut to allow the body to cool to room temperature as it is. Thus was obtained a shaped body for Comparative Example 1.

Example 2

A synthetic quartz glass ingot doped with fluorine was prepared under the conditions similar to those described in Example 1, and the resulting ingot was subjected to homogenization in a manner similar to that described in Example 1.

The homogenized ingot was set inside a high purity graphite crucible, and was heated to 1800° C. to shape the quartz glass into a disk 150 mm in diameter and 50 mm in thickness by deformation utilizing its self-weight.

The thus obtained shaped body was placed inside a synthetic quartz glass vessel to prevent contamination due to impurities from occurring on the body, and the entire vessel was set inside an electric furnace. Then, after holding it at 1150° C. for 20 hours under the atmospheric condition, the body was gradually cooled to 800° C. at a cooling rate of 5° C./hr, at which temperature the current to the furnace was cut to allow the body to cool to room temperature as it is. Thus was obtained a shaped body for Example 2.

Comparative Example 2

A synthetic quartz glass ingot doped with fluorine was prepared under the conditions similar to those described in Example 2, and after subjecting the resulting ingot to homogenization similarly, the resulting body was shaped into a disk 150 mm in diameter and 50 mm in thickness under the same conditions. The thus obtained shaped body was placed inside a synthetic quartz glass vessel, and the entire vessel was set inside an electric furnace. After holding it at 1150° C. for 20 hours under the atmospheric condition, the body was gradually cooled to 900° C. at a cooling rate of 20° C./hr, at which temperature the current to the furnace was cut to allow the body to cool to room temperature as it is. Thus was obtained a shaped body for Comparative Example 2.

Comparative Example 3

A synthetic quartz glass ingot doped with fluorine was prepared under the conditions similar to those described in Example 2, and after subjecting the resulting ingot to homogenization similarly, the resulting body was shaped into a disk 150 mm in diameter and 50 mm in thickness under the same conditions. The thus obtained shaped body was placed inside a synthetic quartz glass vessel, and the entire vessel was set inside an electric furnace. After holding it at 1150° C. for 20 hours under the atmospheric condition, the body was gradually cooled to 500° C. at a cooling rate of 1° C./hr, at which temperature the current to the furnace was cut to allow the body to cool to room temperature as it is. Thus was obtained a shaped body for Comparative Example 3.

Comparative Example 4

After forming a soot body under the conditions similar to those described in Example 1, the resulting body was subjected to a heat treatment in an electric furnace at 1000° C. for 5 hours under a mixed atmosphere of gaseous nitrogen and gaseous oxygen (mixing ratio by volume: $N_2/O_2=80/20$) to control the density distribution. Subsequently, the resulting body was further subjected to a heat treatment for 10 hours under the same temperature condition, but by changing the atmosphere to that of a mixed gaseous $SiF_4$ and He (mixing ratio by volume: $SiF_4/He=3/97$), and the resulting product was slowly passed through a furnace set to a maximum temperature of 1460° C. under an atmosphere of mixed gaseous $SiF_4$ and He (mixing ratio by volume: $SiF_4/He=10/90$) at a speed of 0.7 mm/min to obtain a transparent quartz glass ingot by vitrification. The thus obtained fluorine-doped synthetic quartz glass ingot was subjected to homogenization in a manner similar to that described in Example 2, shaped, and annealed under the similar conditions to obtain a shaped body for Comparative Example 4.

Example 3

A synthetic quartz glass ingot doped with fluorine was prepared under the conditions similar to those described in Example 2, and after subjecting the resulting ingot to homogenization similarly, the resulting body was shaped into a disk 150 mm in diameter and 50 mm in thickness under the same conditions. The thus obtained shaped body was placed inside a synthetic quartz glass vessel, and the entire vessel was set inside an electric furnace. After holding it at 1150° C. for 20 hours under the atmospheric condition, the body was gradually cooled to 960° C. at a cooling rate of 1° C./hr, at which temperature the current to the furnace was cut to allow the body to cool to room temperature as it is. Thus was obtained a shaped body for Example 3.

Example 4

The soot body formed by a process similar to that described in Example 1 was subjected to a heat treatment a heat treatment in an electric furnace at 1000° C. for 5 hours under a mixed atmosphere of gaseous nitrogen and gaseous oxygen (mixing ratio by volume: $N_2/O_2=80/20$) to control the density distribution.

Subsequently, the resulting body was further subjected to a heat treatment for 10 hours under the same temperature condition, but by changing the atmosphere to that of a mixed gaseous $SiF_4$ and He (mixing ratio by volume: $SiF_4/He=10/90$), and the resulting product was slowly passed through a furnace set to a maximum temperature of 1460° C. under an atmosphere of mixed gaseous $SiF_4$ and He (mixing ratio by volume: $SiF_4/He=10/90$) at a speed of 1 mm/min to obtain a transparent quartz glass ingot by vitrification.

The thus obtained quartz glass ingot was set inside a high purity graphite crucible, and was heated to 1800° C. to shape the quartz glass into a disk 150 mm in diameter and 50 mm in thickness by deformation utilizing its self-weight.

The thus obtained shaped body was placed inside a synthetic quartz glass vessel, and the entire vessel was set inside an electric furnace. Then, after holding it at 1150° C. for 20 hours under the atmospheric condition, the body was gradually cooled to 900° C. at a cooling rate of 15° C./hr, at which temperature the current to the furnace was cut to allow the body to cool to room temperature as it is. Thus was obtained a shaped body for Example 4.

Comparative Example 5

A synthetic quartz glass ingot doped with fluorine was prepared under the conditions similar to those described in Example 3, and a synthetic quartz glass shaped body was obtained by subjecting the resulting ingot to homogenization and shaping in a similar manner.

The thus obtained shaped body was placed inside a synthetic quartz glass vessel, and the entire vessel was set inside an electric furnace. After holding it at 1150° C. for 20 hours under the atmospheric condition, the body was gradually cooled to 800° C. at a cooling rate of 2° C./hr, at which temperature the current to the furnace was cut to allow the body to cool to room temperature as it is. Thus was obtained a shaped body for Comparative Example 5.

The shaped bodies obtained in Examples and Comparative Examples above were subjected to the measurement of refractive index by using a Fizeau interferometer.

The birefringence was measured by using a strain meter under crossed nicols. Then, samples were cut out from each of the shaped bodies to measure the internal transmittance for radiations 157 nm and 163 nm, the density of hydrogen molecules, the concentration of OH groups, the concentration of fluorine, and the distributions thereof. The results are given in Table 1 as shown in FIG. 6.

The principal physical properties of the quartz glass above, i.e., the fluorine concentration, the density of hydrogen molecules, the OH group concentration, and the fictive temperature, were measured by laser Raman spectroscopy by a known method. More specifically, the fluorine concentration was measured in accordance with the method described in J. Material Sci., 28 (1993), pp. 2738 to 2744; the density of hydrogen molecules was measured according to the method described in J. Applied Spectroscopy, 46, No. 6 (1987), pp. 632 to 635; the OH group concentration was measured according to the method described in Journal of Applied Physics, 37 (1966), p. 3911; and the fictive temperature was measured in accordance with the method described in J. American Physical Society, 28, No. 6 (1983), pp. 3266 to 3271.

The internal transmittance T as referred in the present invention signifies the internal transmittance per a thickness of 10 mm, and can be calculated by the apparent transmittance D per 10-mm thickness of the specimen and the theoretical transmittance $T_0$. More specifically, by taking a reflection index R and a refractive index n, the values can be obtained in accordance with the equations as follows:

$$R=(n-1)^2/(n+1)^2 \quad (1)$$

$$T_0=(1-R)^2 \quad (2)$$

$$T=D/T_0 \quad (3)$$

The fluorine concentration in mol ppm as referred in the present invention can be obtained by the following conversion equation based on the concentration expressed by weight ppm.

*F mol ppm=0.32×F weight ppm*

The effect of the present invention can be clearly understood from the table given in FIG. 6.

More specifically, referring to the table, the optical materials according to Examples 1 and 2, which completely satisfy the conditions of the present invention, exhibited favorable optical characteristics as a synthetic quartz glass optical material for use with $F_2$ excimer laser.

On the other hand, the material obtained in Comparative Example 1, which yields a ΔF value exceeding 20 mol ppm, it was found that the correction was insufficient as a synthetic quartz glass optical material for use with $F_2$ excimer laser, even though a correction for the fluctuation in refractive index due to ΔF was attempted by controlling the fictive temperature distribution.

Furthermore, concerning Comparative Example 2, in which ΔF value exceeded 20 mol ppm and in which a correction using fictive temperature distribution was not applied, a further increase was observed to occur on the fluctuation of the refractive index.

In case of Comparative Example 3, in which the difference in maximum and minimum fictive temperatures exceeded 50° C., and in Comparative Example 4, in which the ΔF value exceeded 50° C., it was found that the correction was insufficient as a synthetic quartz glass optical material for use with $F_2$ excimer laser, even though a correction for the fluctuation in refractive index due to ΔF was attempted by controlling the fictive temperature distribution.

In Example 3, the fluctuation in refractive index was found to be larger than that obtained in Example 2, because the maximum temperature of the fictive temperature was higher than the preferred range. However, it exhibited optical characteristics sufficient for a synthetic quartz glass optical material for use with $F_2$ excimer laser.

In Example 4, the concave and convex shapes in the distributions of refractive index and fictive temperature were reversed to those obtained in Example 2; however, favorable optical characteristics for a synthetic quartz glass optical material for use with $F_2$ excimer laser were obtained similar to the case of Example 2. In contrast to this, the sample obtained in Comparative Example 5 showed an increase in the fluctuation of refractive index because no correction was made for the fluctuation in refractive index, ΔF, was made by using the fictive temperature distribution.

Furthermore, a sample cut out from the shaped body obtained in Example 2 was irradiated with a $F_2$ excimer laser radiation to investigate the change in transmittance.

More specifically, the transmittance spectrum obtained on the sample subjected to an irradiation of pulsed $F_2$ excimer laser radiations at a pulse energy density of 8 mJ/cm2 for 3.5×105 pulses is shown in FIG. 5.

Further, several types of quartz glass ingots differing in the fluorine concentration were prepared by changing the concentration of $SiF_4$ at 1000° C. under the conditions of preparing the shaped body of Example 1 and the concentration of $SiF_4$ during the vitrification process for obtaining the transparent glass body.

Then, measurements were made on the fluorine concentration, OH group concentration, and the internal transmittance for a radiation 157 nm in wavelength before and after irradiating an excimer laser radiation. The measured results are shown in Table 2 given in FIG. 7.

The effect of the present invention can be clearly understood from the table given in FIG. 7.

For the shaped body obtained in Example 1, the concentration of metallic impurities was measured by using ICP mass analysis and plasma light emission spectroscopy to obtain results as follows.

| Transition metals | |
| --- | --- |
| Cu | 0.2 ppb |
| Ni | 0.4 ppb |
| Ti | 2.8 ppb |
| Cr | 0.3 ppb |
| Fe | 6.2 ppb |

| Alkali metals | |
| --- | --- |
| Na | 8.5 ppb |
| Li | 1.7 ppb |
| K | 2.6 ppb |

| Alkaline earth metals | |
| --- | --- |
| Ca | 3.4 ppb |
| Ba | 1.2 ppb |
| Mg | 1.5 ppb |

FIG. 6 is a Table showing the physical properties and the like of the molded bodies obtained in Examples and Comparative Examples according to the present invention.

FIG. 7 is a Table showing the OH group concentration and the internal transmittance for a radiation 157 nm in wavelength obtained before and after irradiating a $F_2$ excimer laser of a mold ed body obtained in Example 1 according to the present invention, in which the fluorine concentration is varied.

Figure 1:
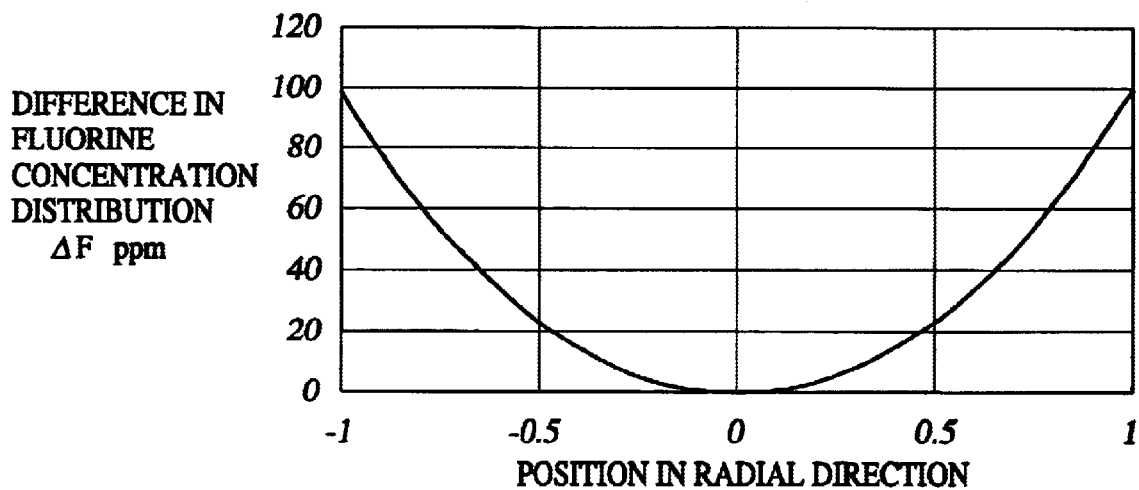
FIG. 1 is a graph showing a distribution in fluorine concentration preferred in the present invention.
Figure 2:
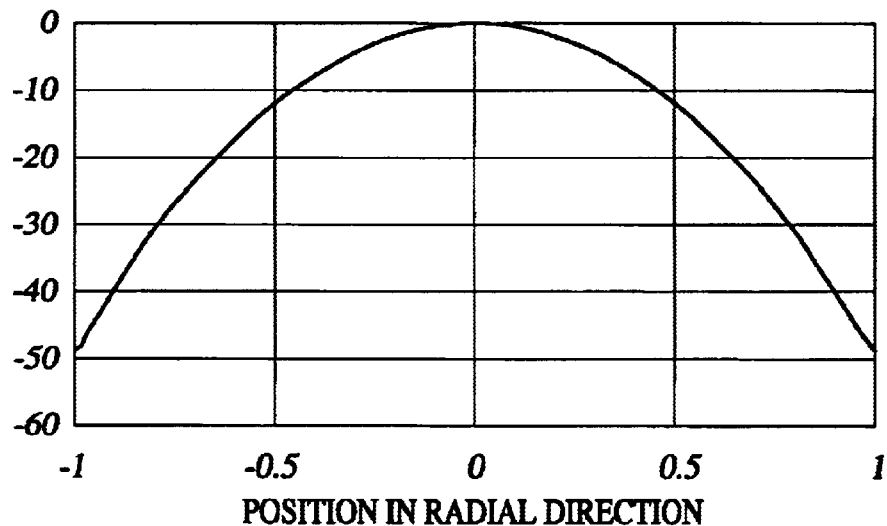
FIG. 2 is a graph showing a distribution in fictive temperature preferred in the present invention.
Figure 3:
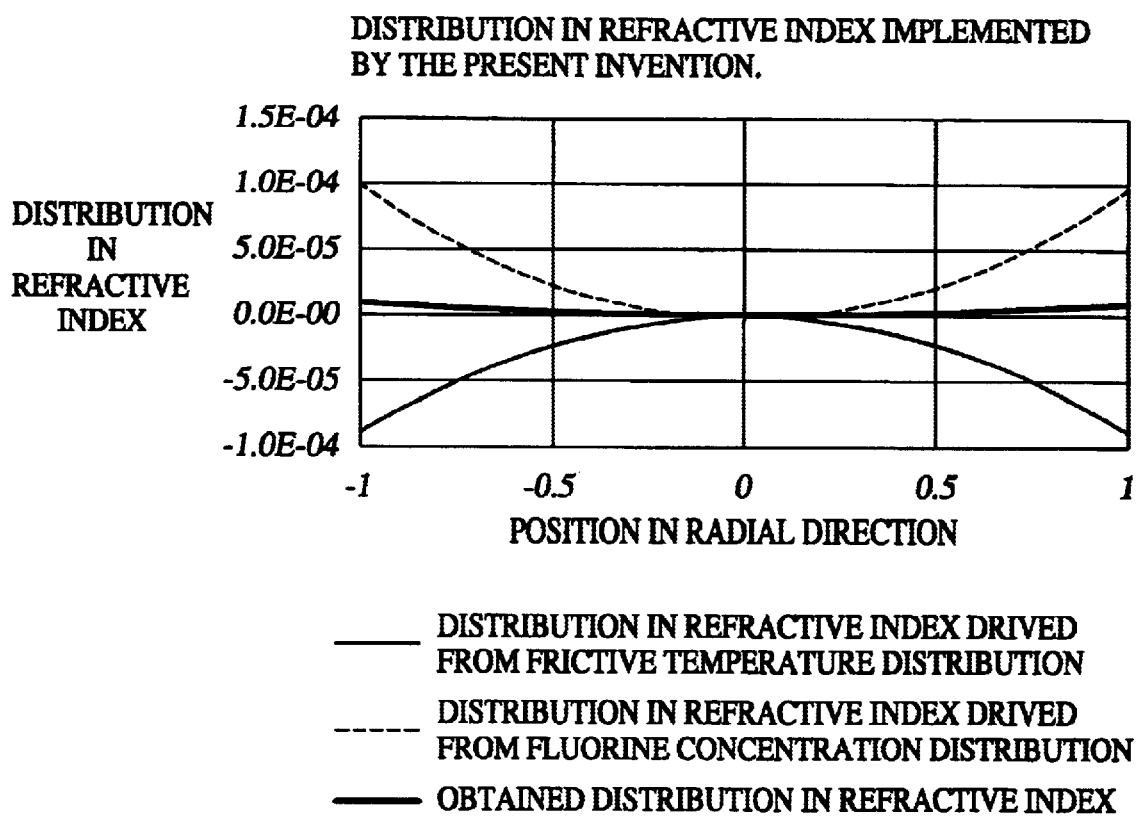
FIG. 3 is a graph showing a distribution in refractive index implemented by the present invention.
Figure 4:
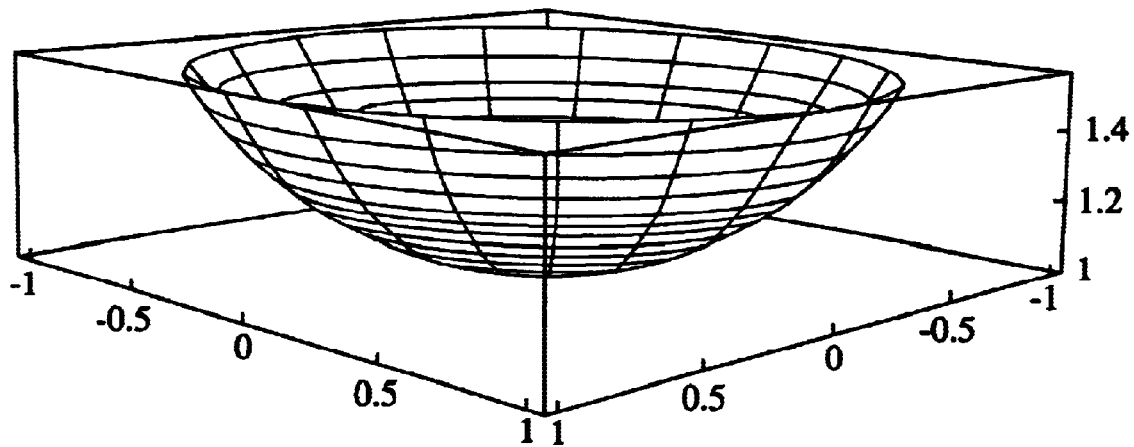
FIG. 4 is a graph showing the concept of an approximately hemispherical distribution.
Figure 5:
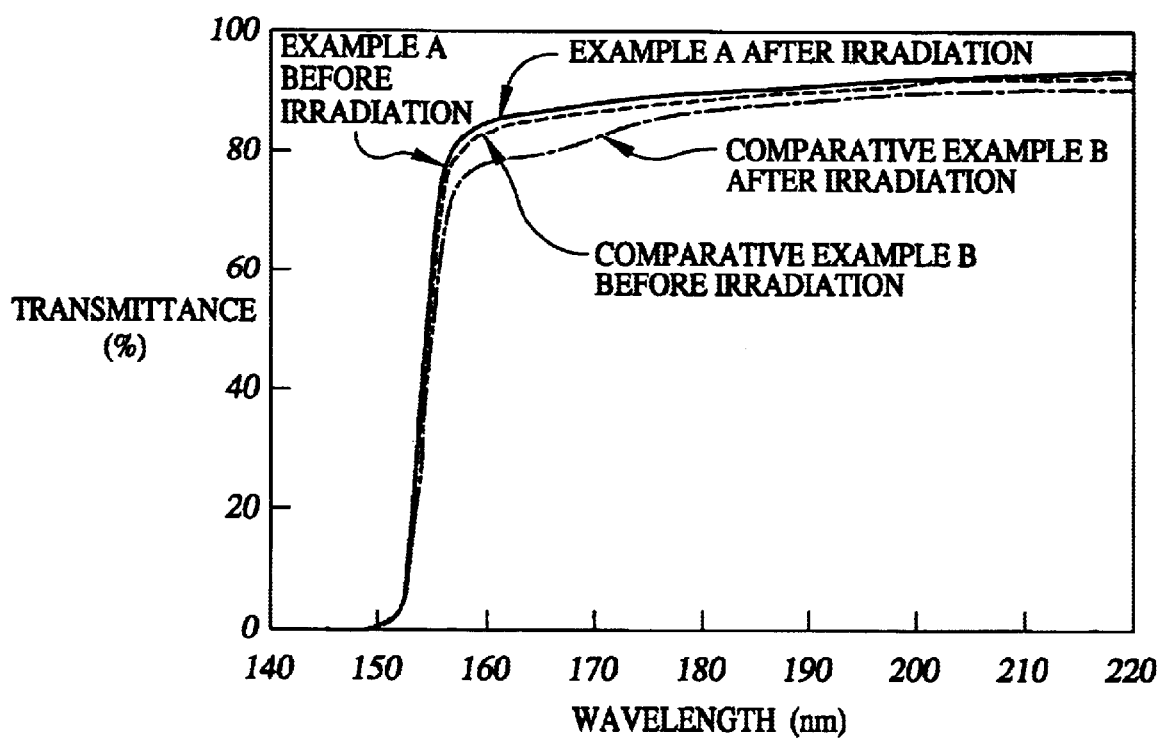
FIG. 5 is graph showing a transmittance spectrum obtained after irradiating a F2 laser radiation to a molded body obtained in Example 2 according to the present invention.

What is claimed is:

1. A synthetic quartz glass optical material comprising quartz glass having an OH group concentration of 0.5 ppm or lower, a fluorine concentration of 0.1 to 2 mol %, a hydrogen molecule density of $5 \times 10^{16}$ molecules/cm$^3$ or lower, said quartz glass having maximum and minimum fluorine concentrations with a difference therebetween less than 20 mol ppm, and said quartz glass having maximum and minimum refraction indices with a difference therebetween of $2 \times 10^{-5}$ or lower.

2. A synthetic quartz glass optical material comprising quartz glass having an OH group concentration of 0.5 ppm or lower, a fluorine concentration of 0.1 to 2 mol %, a hydrogen molecule density of $5 \times 10^{16}$ molecules/cm$^3$ or lower, maximum and minimum fluorine concentrations with a difference therebetween that is within 100 mol ppm, maximum and minimum fictive temperatures with a difference there between that is within 50° C., and maximum and minimum refraction indices having a difference therebetween set to $2\times10^{-5}$ or lower by forming a fluctuation in refractive indices of the quartz glass in accordance with the fictive temperature so as to eliminate the fluctuation in refractive indices caused by distribution in fluorine concentration.

3. A synthetic quartz glass optical material as claimed in claim 2, wherein the maximum value of fictive temperature is 920° C. or lower.

4. A synthetic quartz glass optical material as claimed in claim 1, wherein the silica glass has an internal transmittance for a radiation 157 nm in wavelength emitted from $F_2$ excimer lasers that is 70% or higher.

5. A synthetic quartz glass optical material as claimed in claim 2, wherein the silica glass has an internal transmittance for a radiation 157 nm in wavelength emitted from $F_2$ excimer lasers that is 70 % or higher.

6. A synthetic quartz glass optical material as claimed in claim 3, wherein the silica glass has an internal transmittance for a radiation 157 nm in wavelength emitted from $F_2$ excimer lasers that is 70 % or higher.

7. A synthetic quartz glass optical material as claimed in claim 1, wherein the silica glass has an internal transmittance for a radiation 163 nm in wavelength that is 90% or higher.

8. A synthetic quartz glass optical material as claimed in claim 2, wherein the silica glass has an internal transmittance for a radiation 163 nm in wavelength that is 90% or higher.

9. A synthetic quartz glass optical material as claimed in claim 3, wherein the silica glass has an internal transmittance for a radiation 163 nm in wavelength that is 90% or higher.

10. A synthetic quartz glass optical material as claimed in claim 1, wherein the silica glass has a drop in transmittance that is 5% or less per 10 mm for a radiation 157 nm in wavelength after irradiating thereto $3\times10^6$ pulses of $F_2$ excimer laser radiation at an energy density per pulse of 10 mJ/cm².

11. A synthetic quartz glass optical material as claimed in claim 2, wherein the silica glass has a drop in transmittance that is 5% or less per 10 mm for a radiation 157 nm in wavelength after irradiating thereto $3\times10^6$ pulses of $F_2$ excimer laser radiation at an energy density per pulse of 10 mJ/cm².

12. A synthetic quartz glass optical material as claimed in claim 3, wherein the silica glass has a drop in transmittance that is 5% or less per 10 mm for a radiation 157 nm in wavelength after irradiating thereto $3\times10^6$ pulses of $F_2$ excimer laser radiation at an energy density per pulse of 10 mJ/cm².

13. A synthetic quartz glass optical material as claimed in claim 1, wherein the silica glass has a birefringence measured at a wavelength of 633 nm that is 0.5 nm/cm or lower.

14. A synthetic quartz glass optical material as claimed in claim 2, wherein the silica glass has a birefringence measured at a wavelength of 633 nm that is 0.5 nm/cm or lower.

15. A synthetic quartz glass optical material as claimed in claim 3, wherein the silica glass has a birefringence measured at a wavelength of 633 nm that is 0.5 nm/cm or lower.

16. A synthetic quartz glass optical member formed by using a synthetic quartz glass optical material as described in claim 1.

17. A synthetic quartz glass optical member formed by using a synthetic quartz glass optical material as described in claim 2.

18. A synthetic quartz glass optical member formed by using a synthetic quartz glass optical material as described in claim 3.

* * * * *